(12) United States Patent
Boyen

(10) Patent No.: US 8,108,678 B1
(45) Date of Patent: Jan. 31, 2012

(54) IDENTITY-BASED SIGNCRYPTION SYSTEM

(75) Inventor: Xavier Boyen, Palo Alto, CA (US)

(73) Assignee: Voltage Security, Inc., Cupertino, CA (US)

(*) Notice: Subject to any disclaimer, the term of this patent is extended or adjusted under 35 U.S.C. 154(b) by 2367 days.

(21) Appl. No.: 10/774,720

(22) Filed: Feb. 9, 2004

Related U.S. Application Data

(60) Provisional application No. 60/447,033, filed on Feb. 10, 2003.

(51) Int. Cl.
  *H04L 9/32* (2006.01)
  *H04K 1/00* (2006.01)
  *H04L 9/00* (2006.01)
  *H04L 9/30* (2006.01)
(52) U.S. Cl. .......................... 713/176; 380/30
(58) Field of Classification Search .............. 713/176; 380/30
  See application file for complete search history.

(56) References Cited

U.S. PATENT DOCUMENTS

| | | | |
|---|---|---|---|
| 5,159,632 A | | 10/1992 | Crandall |
| 6,396,928 B1* | | 5/2002 | Zheng ........................ 380/285 |
| 6,792,530 B1* | | 9/2004 | Qu et al. ..................... 713/156 |
| 6,826,687 B1* | | 11/2004 | Rohatgi ....................... 713/171 |
| 6,834,112 B1* | | 12/2004 | Brickell ....................... 380/279 |
| 6,910,129 B1* | | 6/2005 | Deng et al. ................... 713/171 |
| 6,950,523 B1* | | 9/2005 | Brickell et al. ............... 380/286 |
| 7,113,594 B2* | | 9/2006 | Boneh et al. .................. 380/28 |
| 7,353,395 B2* | | 4/2008 | Gentry et al. ................. 380/277 |
| RE40,687 E* | | 3/2009 | Oshima et al. ................ 380/201 |
| 2002/0018569 A1* | | 2/2002 | Panjwani et al. ............. 380/247 |
| 2002/0046286 A1 | | 4/2002 | Caldwell et al. |
| 2002/0076042 A1 | | 6/2002 | Sandhu et al. |
| 2003/0081785 A1* | | 5/2003 | Boneh et al. .................. 380/277 |
| 2003/0115448 A1 | | 6/2003 | Bouchard |
| 2003/0179885 A1* | | 9/2003 | Gentry et al. ................. 380/277 |
| 2003/0182554 A1 | | 9/2003 | Gentry et al. |
| 2004/0003270 A1* | | 1/2004 | Bourne et al. ................ 713/193 |

OTHER PUBLICATIONS

J.H. An et al "On the security of join signature and encryption" in Proc. Eurocrypt '02, LNCS 2332, 2002; Cryptography ePrint Archive Report 2002/046; http://eprint.iacr.org/2002/046/ (Jun. 17, 2002).
D. Boneh et al. "Identity-based encryption from the Weil pairing." Cryptography ePrint Archive Report 2001/090; http://eprint.iacr.org/2001/090/ (2001).
J.C. Cha et al. An identity-based signature from the gap Diffie-Hellman groups. Cryptography ePrint Archive Report 2002/018; http://eprint.iacr.org/2002/018/ (2002).
F. Hess "Exponent group signature schemes and efficient identity based signature schemes based on pairings" Cryptography ePrint Archive Report 2002/012; http://eprint.iacr.org/2002/012/ (2002).

(Continued)

*Primary Examiner* — Nathan Flynn
*Assistant Examiner* — Trang Doan
(74) *Attorney, Agent, or Firm* — Treyz Law Group; G. Victor Treyz; David C. Kellogg

(57) ABSTRACT

Systems and methods are provided for performing digital signing and encryption using identity-based techniques. A message may be signed and encrypted in a single operation and may be decrypted and verified in two separate operations. Messages may be sent anonymously and confidentially. The systems and methods support message confidentiality, signature non-repudiation, and ciphertext authentication, ciphertext unlinkability, and anonymity.

18 Claims, 8 Drawing Sheets

OTHER PUBLICATIONS

B. Libert et al. "New identity based signcryption schemes based on pairings" Cryptography ePrint Archive Report 2003/023; http://eprint.iacr.org/2003/023/ (2003).

B. Lynn "Authenticated identity-based encryption" Cryptography ePrint Archive Report 2002/072; http://eprint.iacr.org/2002/072/ (2002).

J. Malone_Lee "Identity-based signcryption" Cryptography ePrint Archive Report 2002/098; http://eprint.iacr.org/2002/098/ (2002).

K.G. Paterson. "ID-based signatures from pairings on elliptic curves" Cryptography ePrint Archive Report 2002/004; http://eprint.iacr.org/2002/004/ (2002).

Boneh et al., "Identity-Based Encryption from the Weil Pairing", Journal of Computing, vol. 32, No. 3, pp. 586-615, 2003, [online], retrieved Feb. 10, 2009, <http://crypto.stanford.edu/~dabo/papers/bfibe.pdf>.

Horwitz et al., "Toward Hierarchical Identity-Based Encryption", Advances in Cryptology: EUROCRYPT 2002 (LNCS 2332), pp. 466-481, 2002, [online], retrieved Feb. 10, 2009, <http://math.scu.edu/~jhorwitz/pubs/hibe.pdf>.

Goyal et al., "Black Box Accountable Authority Identity-Based Encryption", CCS 2008—ACM Conference on Computer and Communications Security, Nov. 3, 2008, [online], retrieved Feb. 10, 2009, <http://research.microsoft.com/en-us/people/vipul/bbaibe.pdf>.

* cited by examiner

IDENTITY-BASED SIGNCRYPTION SYSTEM

This application claims the benefit of provisional application No. 60/447,033, filed Feb. 10, 2003, which is hereby incorporated by reference herein in its entirety.

BACKGROUND OF THE INVENTION

This invention relates to systems for signing and encrypting data, and more particularly, to identity-based-encryption (IBE) signcryption systems.

A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient exchange the shared key in a secure manner.

Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

One conventional public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKI (public-key infrastructure) cryptographic systems.

Identity-based-encryption (IBE or IB) public-key cryptographic systems have also been proposed. As with PKI cryptographic systems, a sender in an IBE cryptosystem may encrypt a message for a given recipient using the recipient's public key. The recipient may then decrypt the message using the recipient's corresponding private key. The recipient can obtain the private key from a private key generator associated with the recipient.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

Public key cryptographic systems may be used to produce digital signatures. A recipient of a message that has been digitally signed can use the digital signature to verify the identity of the message's sender and to confirm that the message has not been altered during transit.

In a typical digital signature arrangement, a sender uses a cryptographic hash function to produce a message digest. The message digest is much smaller than the original message, but is still unique to the message for practical purposes. The sender then uses the sender's private key to sign the message digest. The process of signing the message digest uses a mathematical operation that can only be performed by the sender who possesses the private key. The message and signed message digest (the "digital signature") may then be sent to a recipient.

The recipient can apply the same hash function to the received message to produce a message digest. Using the public key of the sender, the recipient can attempt to verify the signed version of the message digest that the recipient has received from the sender. The verification procedure uses the sender's public key in a mathematical operation to determine whether the signature was indeed created from the same message digest using the correct private key. If the verification function is successful, the signed version of the message digest will be proven to originate from the message digest that the recipient has produced by applying the hash function directly to the message. A successful verification operation therefore allows the recipient to confirm the true authorship of the message and to confirm that the message has not been altered.

By using both public key signatures and public key encryption, messages can be sent securely and authorship and message authenticity can be verified. Schemes for digitally signing and encrypting messages are sometimes referred to as signcryption schemes.

SUMMARY OF THE INVENTION

In accordance with the present invention systems and methods are provided that use identity-based schemes to support digital signature and encryption functions. The signcryption scheme of the present invention has a number of useful properties.

The signcryption scheme provides confidentiality. A sender can send a confidential message to a recipient. An attacker is unable to read the contents of the message, so communications between the sender and recipient can be maintained in secrecy.

The scheme also provides non-repudiation. Digital signatures cannot be repudiated. This non-repudiation property makes the digital signature of the sender universally verifiable, so the sender cannot deny having signed a message. Message integrity can be verified.

The signcryption scheme also provides ciphertext unlinkability. A sender of an encrypted and signed message (ciphertext) can disavow having created the ciphertext for any particular recipient. This is the case even though the sender remains bound to the signed message in the ciphertext. The unlinkability property of the present signcryption scheme ensures senders that their signatures will only apply to the messages they have created, and will not unintentionally apply to metadata associated with a given message's transmission (e.g., the message transmission date, the IP address of the recipient, etc.).

Another property of the signcryption scheme of the present invention relates to ciphertext authentication. Only the intended legitimate recipient of the message ciphertext can verify that the ciphertext and the signed message it contains were created by the sender.

The ciphertext produced by the signcryption scheme is anonymous. Both the identity of the sender and the recipient are hidden from anyone who does not possess the recipient's decryption key.

Unlike conventional monolithic signcryption schemes in which a single operation is used for both decryption and signature verification, the signcryption scheme of the present invention allows use of a two-operation decryption and verification arrangement. In a first step, ciphertext from the sender is decrypted by the recipient to reveal the identity of the sender, the message contents, and the digital signature of the sender. In a second step, which follows the first, the recipient can use the sender's identity, message contents, and the sender's digital signature to verify the digital signature. During verification, the recipient can authenticate the message author (i.e., the sender) and the message contents. Because the verification process is decoupled from the decryption process, the verification process can be performed by third parties as well as the intended message recipient. For example, a message recipient can forward the identity of the sender, the message, and the sender's digital signature to a third party over a communications network for verification.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to encrypting and digitally signing data. Such data may be transferred between users and is therefore generally referred to herein as a "message." Users are generally individuals or organizations with their associated computers or other equipment. Users who encrypt and sign messages and who send these messages to others are referred to herein as "senders." Users who receive these transmissions from senders are referred to herein as "recipients."

The processes involved in signing and encrypting messages at senders and in performing corresponding decryption and verification operations at recipients are sometimes referred to herein as "signcryption" processes.

The signcryption processes of the present invention uses mathematical operations associated with identity-based-encryption (IBE or IB) schemes such as the Boneh-Franklin IBE scheme, rather than conventional PKI operations. The signcryption processes of the present invention are therefore sometimes referred to herein as "IBE signcryption operations" or "IBE signcryption."

Figure 1:
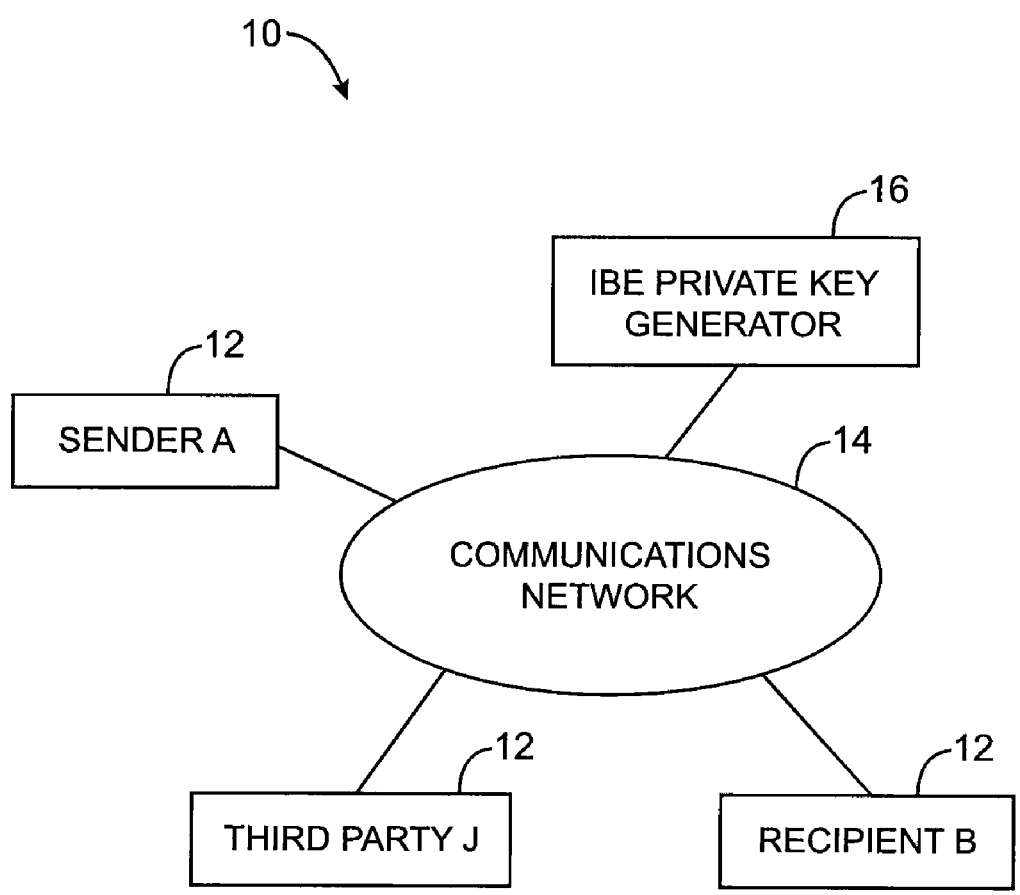
FIG. 1 is a diagram of an illustrative identity-based signcryption system in accordance with the present invention.

Equipment of the type shown in FIG. 1 may be used to support IBE signcryption operations. A user 12 in system 10 may send a secure message to one or more other users over a communications network 14. For example, sender A may send a message to a recipient B over network 14. Third party users such as third party J may also use communications network 14 (e.g., to receive certain information from a recipient such as recipient B).

The present invention is sometimes described in connection with system environments in which the sender of a message is an individual who is associated with one organization, whereas the recipient is an individual associated with another organization. In general, however, individuals, organizations, parts of organizations, or any other suitable parties or entities may exchange messages.

Moreover, the messages that are carried by the system need not be email messages, although email messages are sometimes used as an example. The messages may be email messages, instant messages, or any other suitable electronic message or data. Messages may include any suitable digital information (e.g., text, graphics, audio, video, commands, executable code, data, etc.).

Users may communicate with each other using equipment such as personal computers, portable computers, workstations, mainframe computers, networked computers or terminals, handheld computers, or any other suitable electronic or computing equipment. Multiple individuals or organizations may use the same device. For example, a group of workers in an office may share the use of a single computer terminal that is connected to a host computer in a local area network.

The equipment of FIG. 1 may be interconnected by communications paths in communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 generally has multiple IBE private key generators 16. Each IBE private key generator 16 may be associated with a different set of users. An IBE private key generator and its associated users is called a "district." In a typical scenario, a large organization may have multiple districts. For example, one district may be used for securing communications with members of the organization's sales force. Another district may be used for securing communications with the organization's managers. Districts need not be mutually exclusive. For example, a manager in the sales department may be a member of both of this organization's districts.

Various computing devices may be used with network 14 to support the features of the signcryption system. For example, computing equipment may be used to implement the functions of a server or other computer equipment at each IBE private key generator 16. Servers may also be used to support the functions of an IBE public parameter directory, an IBE public parameter host, a certificate authority, mail servers, and other entities. Such servers may be co-located with a sender, may be connected to the network 14 as an independent third-party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or any other electronic message or collection of data may be sent or otherwise transferred between users. For clarity, the present invention is sometimes described in the context of email messages that are sent over the Internet. This is merely illustrative. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient. Other user activities in system 10 may be entirely automated so that no human intervention is generally required. As one example, the user at one device 12 may be a banking institution that desires to use encrypted email communications to deliver encrypted and digitally signed bank statements to account holders at other devices 12 over communications network 14. The statement preparation and distribution processes may be automated so that no operator intervention is generally needed at the banking institution's equipment once the system has been properly set up. User receipt of the statements may also be automated. System functions involved in presenting on-screen options for humans to respond to (e.g., by clicking on them using a computer mouse) can be automated using software running on the components of the system. Situations where a particular function may involve manual intervention or a computer-implemented operation will be clear from context in the following discussion.

During operation of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties.

Sometimes authentication information and other information (in addition to the messages being sent from the senders to the recipients in system 10) such as IBE parameters and private keys must be conveyed between parties securely (e.g., between a sender and a private key generator, between equipment associated with a recipient and a private key generator, between a recipient and a third party, etc.). A number of different approaches may be used to convey information in system 10 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., because the communications path is physically under the control of a trusted party), and information may be conveyed securely by encrypting the information (e.g., in a message) before sending it over an insecure (or secure) link.

The operation of system 10 may involve the use of traditional public-key-encryption cryptographic techniques such as used with RSA public-key cryptography. For example, the secure sockets layer protocol, which may be used to secure communications between parties when a web browser or other application is used, involves the use of certificates from trusted certificate authorities. Digital signatures can also be implemented using traditional public-key-encryption techniques. These traditional public key cryptographic techniques are referred to herein as "PKI" cryptographic techniques.

The operation of system 10 also uses identity-based-encryption (IBE or IB) cryptographic techniques. These cryptographic techniques are referred to herein as "IBE" or "IB" cryptographic techniques.

PKI and IBE encryption schemes use an asymmetric approach. Some information (so-called public key information) is used to encrypt data. Other corresponding information (so-called private key information) is used to decrypt the encrypted data.

To enhance the efficiency of the IBE decryption and encryption processes in the context of IBE signcryption, "two-step" decryption techniques may be used in which a message key (e.g., a symmetric message key, comprising, e.g., a symmetric session key for encryption and a symmetric MAC (message authentication code) key for tamper detection) is used to encrypt the contents of a message and to append to it certain tamper detection information prior to transmission to the recipient. The IBE process may then be used to sign and encrypt, or signcrypt, the symmetric message keys. The message that is sent from the sender to the recipient contains the IBE-signcrypted message keys and the message-key-encrypted-and-tamperproofed message contents. At the recipient, the recipient can use the IBE private key to decrypt and authenticate the message keys. The message key may then be used by the recipient to decrypt the rest of the message and check that it has not been altered. These two-step IBE processes may be more efficient than "pure" or "single step" IBE encryption algorithms in which the IBE algorithm alone is used to encrypt the entire message. Both types of approaches (and analogous multi-layer IBE encryption approaches) are generally referred to herein as simply "IBE" schemes for clarity.

The IBE signcryption scheme of the present invention is based on bilinear maps. The use of bilinear maps in the context of an identity-based encryption scheme (the so-called Boneh-Franklin IBE scheme) is described in "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001). See also http://eprint.iacr.org/2001/090 by Dan Boneh and Matthew Franklin. With the Boneh-Franklin IBE scheme, IBE encryption is based on the properties of elliptic curve bilinear maps such as a Weil Pairing or Tate Paring. For clarity, aspects of the IBE signcryption scheme of the present invention will sometimes be described in the context of elliptic curves. This is, however, merely illustrative. Any suitable approach for IBE signcryption may be used with system 10 if desired. For example, the IBE signcryption scheme may use hyperelliptic curve bilinear maps rather than elliptic curve bilinear maps.

Initially, when the system is set up, IBE private key generators (e.g., IBE private key generators such as IBE private key generator 16 of FIG. 1) each obtain or generate a master secret σ. For example, each private key generator may create a master secret from a number that is randomly generated at the private key generator by a processor housed inside a tamper-proof enclosure. The master secret may also be produced off-site and delivered to the private key generator 16.

The master secret (also sometimes referred to as a secret master key or a master key) is secret information that is used by the private key generator 16 to generate private keys. In an environment in which a message may be encrypted to a particular individual recipient, the recipient's private key can be used to decrypt the encrypted message. In an environment in which a message is encrypted to an associated entity (e.g., the recipient's organization), the private key associated with the organization can be used to decrypt the message.

After various setup operations have been performed and the master secret σ has been obtained, the private key generator may use the master secret in generating IBE public parameter information. The IBE public parameter information that is generated may include public parameters g and $g^\sigma$, as well as additional public parameters used to specify the mathematical groups (such as the groups of points on an elliptic curve or hyperelliptic curve) in which the calculations are performed. In the subsequent description, mention of the public parameter g assumes an accompanying specification of the mathematical groups (e.g., the elliptic or hyperelliptic curve). The parameter g may first be generated by the IBE private key generator (e.g., using a random number generator). The parameter $g^\sigma$ may then be generated by the IBE private key generator. The exponential notation (g raised to the σ) in this example denotes the multiplication of the elliptic curve point g (or hyperelliptic curve point g) by the integer σ, resulting in the elliptic curve point (or hyperelliptic curve point) $g^\sigma$. While multiplication (calculating $g^\sigma$) is straightforward, the inverse operation (determining σ from knowledge of g and $g^\sigma$) is so computationally expensive that it is impractical for an attacker to obtain σ in this way.

The IBE public parameter information (e.g., the parameters g and $g^\sigma$ and other associated information) may be represented by numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character or string form (e.g., in the form of an email address). Because of the inherent equivalency between these different representational schemes, the techniques involved in converting letters or symbols into numbers or for representing multiple numbers or strings as a single number or other such operations are not described in detail herein.

After the IBE public parameter information (e.g., g and $g^\sigma$) has been determined, the IBE private key generator 16 may make this information available to users in system 10. The public parameter information may be provided to the users using any suitable technique. For example, users may send the public parameter information to each other in email messages or use other suitable peer-to-peer distribution schemes. If desired, the private key generator 16 may publish the public parameter information by using a directory service or by placing the public parameter information on a particular host server that a user can reach using an associated domain name or other suitable service name that is generated based on an appropriate public key (e.g., using a known service-name generation rule). These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters g and $g^\sigma$ may be provided to a user together in a single transmission or separately in two transmissions. If parameters g and $g^\sigma$ are provided separately, each parameter may be distributed using a different distribution mechanism. For example, g may be provided to a user over a secure sockets layer path and $g^\sigma$ may be conveyed to the user in an encrypted email message. As another example, all users may know g and/or other public parameter information (such as which hash functions are used, which elliptic curve is used, etc.) in advance (e.g., g may be built into user software) and $g^\sigma$ may be distributed electronically. If desired, g may be the same for all or substantially all users in the system. Moreover, g and $g^\sigma$ may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the IBE public parameter information (e.g., public parameters g and $g^\sigma$) has been provided to a user (i.e., a sender) who desires to send an encrypted and digitally signed message to another user (i.e., a recipient), the sender may digitally sign and encrypt and send the message to the recipient. An IBE encryption and signing engine (a "signcryption engine") implemented on the sender's equipment may be used to sign and encrypt the message. The IBE signcryption encryption engine may use the IBE public parameter information (e.g., g and $g^\sigma$) and an appropriate key parameters such as the sender's IBE private key and the recipient's IBE public key (which is based on the recipient's identity) to sign and encrypt ("signcrypt") the message.

When the IBE-signcrypted message is received, the IBE private key that corresponds to the IBE public key can be used to decrypt the message. The IBE private key of the recipient is generated by the IBE private key generator 16. An IBE decryption engine and an IBE verification engine may be used to perform decryption and verification operations on the IBE-signcrypted message and sender identity and signature information. The IBE decryption engine takes as inputs the IBE-encrypted message and the IBE private key of the recipient and produces the unencrypted version of the message as an output, along with the identity of the sender and a signature of the message. The IBE verification engine performs verification operations using the identity of the sender (i.e., the sender's IBE public key $ID_A$), the message, and the digital signature of the message by the sender (for a sender A, this is sometimes referred to as $SIG_A(M)$).

The IBE signcryption and decryption and verification engines may use software to implement the desired IBE encryption, decryption, signing, and verification operations. These engines may be provided to equipment in the system as part of the software applications used by users (e.g., email messaging software), as part of the message management software provided to organizations in system 10, as a downloadable program or plug-in that is available to senders, recipients, and other users in system 10, as part of an operating system, or using any other suitable technique.

Identity-based encryption and signcryption schemes are "identity-based" because the encryption and signcryption processes at the sender use an IBE public key ID that is generally based on the recipient's identity. The identity of a user in an IBE encryption or signcryption scheme may be represented by any suitable string, number, or symbol. For example, the identity of a message recipient may be represented by or based on that recipient's email address, name, or social security number. An advantage of using IBE schemes is that a sender can generally determine the identity (e.g., the email address) of an intended recipient without the complexities that would be involved in obtaining the PKI public key of the intended recipient with traditional PKI schemes such as the RSA cryptographic scheme. For example, the IBE public keys ID may be the same as or based on user email addresses, which are readily obtainable and are easily authenticated by human inspection.

Each IBE private key generator generally has multiple associated users. An IBE private key generator may generate an IBE private key for each of its associated users based on the IBE public keys (the ID's) of each of these users (e.g., based on the users' identities).

The form of IBE public key ID that is used for a given IBE signcryption scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form ID values based not only on the users' identities (i.e., email addresses) but also validity period information. The validity period acts as an access policy for the encrypted message that is more generally applicable than the user-specific email address identity information.

When a validity period is used as part of an IBE public key ID, it is not permissible to access the contents of a message encrypted using that ID if the current date does not fall within the specified validity period. This policy may be enforced by the private key generators. If the current date is not within the validity period specified in the public key, a private key generator will refuse to generate and provide an otherwise authorized key requester (e.g., a message recipient or authorized agent for the message recipient) with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys ID (i.e., Q=joe@navy.com|top_secret, etc.). These approaches are merely illustrative of the ways in which policy-based criteria may be added to a user identity such as a user email address when forming the IBE public key for each user (e.g., the ID for each user). Any suitable approach for forming IBE public keys based on user identity information and additional criteria may be used if desired.

A sender desiring to send an IBE-signed and encrypted message should have information sufficient to construct the IBE public key ID of the intended message recipient (e.g., $ID_B$ for a recipient B). This information may include information on an individual recipient's identity (e.g., an email address), information on how to construct the IBE public key ID from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted.

Figure 2:
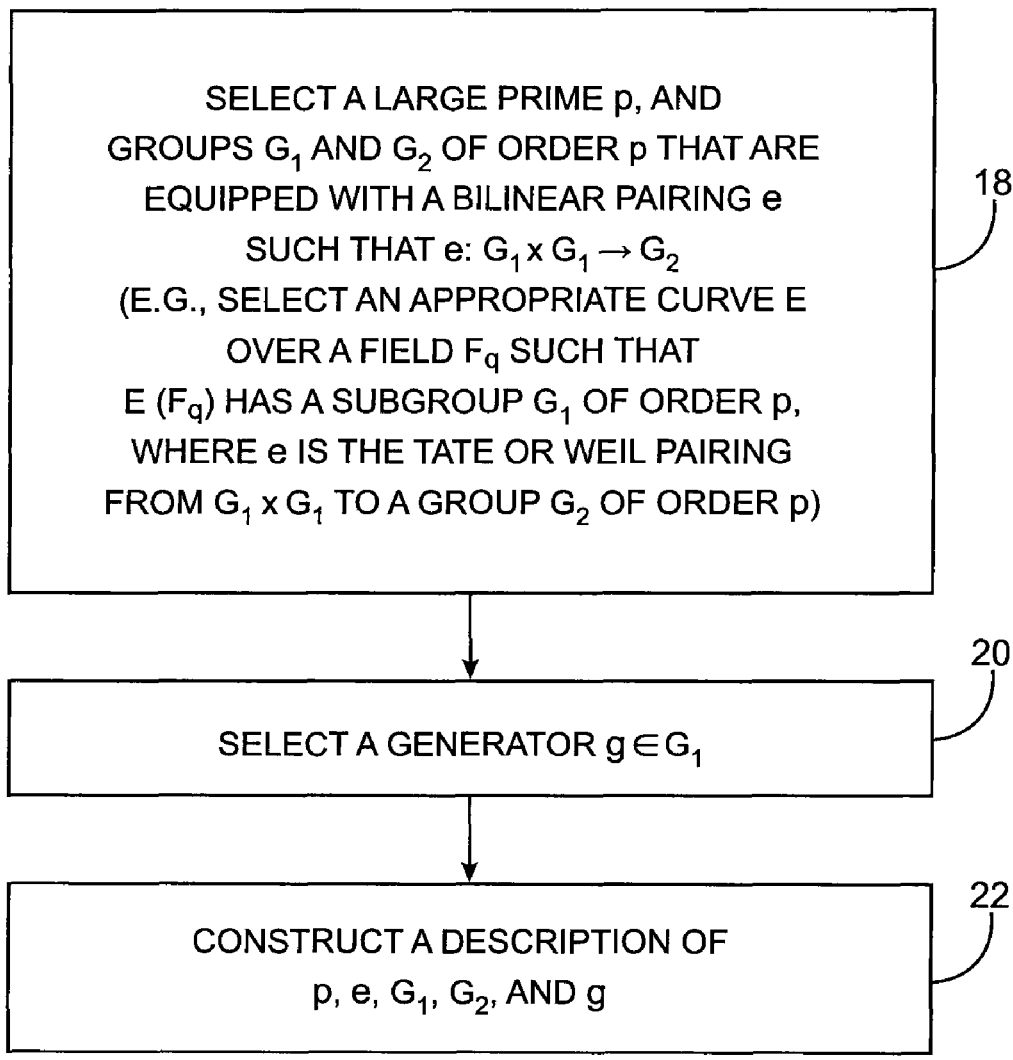
FIGS. 2 and 3 are flow charts of illustrative steps involved in setting up the signcryption scheme in accordance with the present invention.
Figure 3:
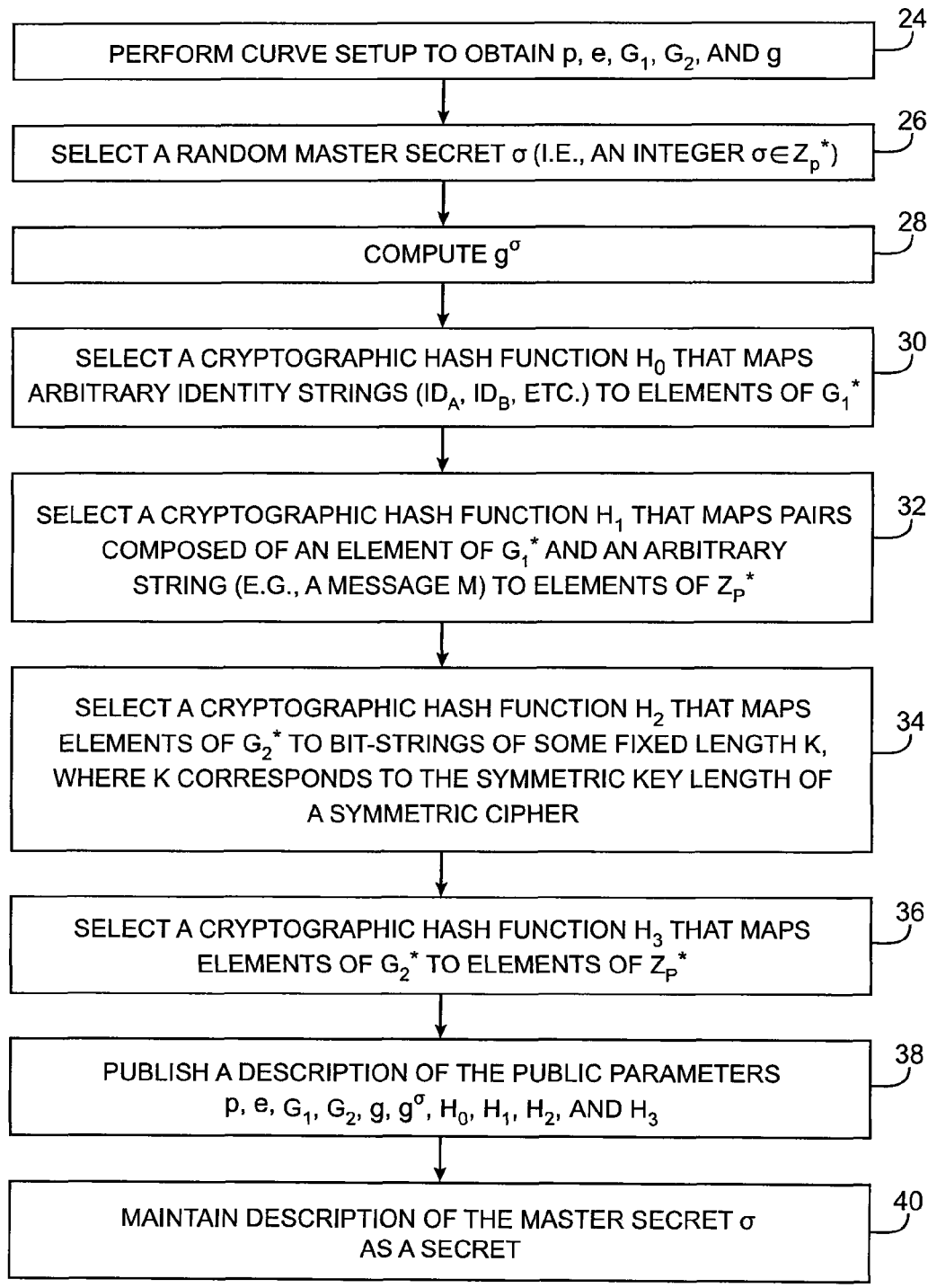

Illustrative setup steps for the signcryption scheme of the present invention are shown in FIGS. 2 and 3. FIG. 2 shows steps involved in setting up or defining which bilinear pairing to use ("curve setup"). FIG. 3 shows steps involved in additional signcryption setup operations. The setup operations of FIGS. 2 and 3 may be performed by private key generator 16.

As shown in FIG. 2, during the setup operation of step 18, the private key generator 16 may select a large prime p and groups $G_1$ and $G_2$ of order p that have a bilinear pairing e. The bilinear pairing e maps pairs of elements from $G_1$ to two corresponding elements in $G_2$. As an example, during step 18 an appropriate elliptic or hyperelliptic curve E may be selected over a field $F_q$ such that $E(F_q)$ has a subgroup $G_1$ of order p, where e is the Tate or Weil pairing or any other suitable bilinear pairing from $G_1 \times G_1$ to a group $G_2$ of order p).

At step 20, the private key generator 16 may be used to select a generator g in $G_1$.

At step 22, the private key generator 16 may be used to construct a description of p, e, $G_1$, $G_2$, and g. This description may be used in IBE encryption operations, in IBE signcryption operations, and in IBE decryption and verification operations in system 10.

Operations associated with signcryption setup are shown in FIG. 3. At step 24, private key generator 16 may perform curve setup operations such as the setup operations of FIG. 2 to obtain an appropriate p, e, $G_1$ $G_2$, and g for signcryption. At step 26, the private key generator 16 may generate a master secret σ. For example, the private key generator 16 may select a random master secret a such as an integer in $Z_p^*$. At step 28, the private key generator may compute $g^\sigma$, using the appropriate group multiplication operation.

At step 30, a cryptographic hash function $H_0$ that maps arbitrary identity strings (e.g., $ID_A$, $ID_B$, etc.) to elements of $G_1^*$ may be selected.

At step 32, a cryptographic hash function $H_1$ that maps pairs composed of an element of $G_1^*$ and an arbitrary string (e.g., a message M) to elements of $Z_p^*$ may be selected.

At step 34, a cryptographic hash function $H_2$ may be selected that maps elements of $G_2^*$ to bit-strings of a fixed length K, where K corresponds to the symmetric key length of a symmetric cipher.

At step 36, a cryptographic hash function $H_3$ that maps elements of $G_2^*$ to elements of $Z_p^*$ may be selected.

At step 38, the private key generator 38 may publish a description of the public parameters p, e, $G_1$, $G_2$, g, $g^\sigma$, $H_0$, $H_1$, $H_2$, and $H_3$. As described above, there are various suitable techniques for making this IBE public parameter information available to users in system 10. For example, some of the public parameter information (e.g., information on which hash functions are being used) may be incorporated into user software or may otherwise be part of an implicit set of definitions for the users, while other public parameter information (e.g., g and $g^\sigma$) may be placed on an IBE public parameter host server that users can access using a particular rule. Users can, for example, use a known rule to generate the domain name or other service name of such an IBE public parameter host server based on an appropriate IBE public key ID. Users can then download g and $g^\sigma$ over network 14.

At step 40, the IBE private key generator 16 may maintain a description of the master secret σ in secrecy.

During operation of system 10, the private key generator 16 may receive requests for IBE private keys SK for the users in the system (e.g., a request for the IBE private key $SK_A$ of sender A, a request for the IBE private key $SK_B$ of recipient B, etc.). In response to these private key requests, the IBE private key generator 16 may generate appropriate IBE private keys and may provide these keys to authorized requesters.

Figure 4:
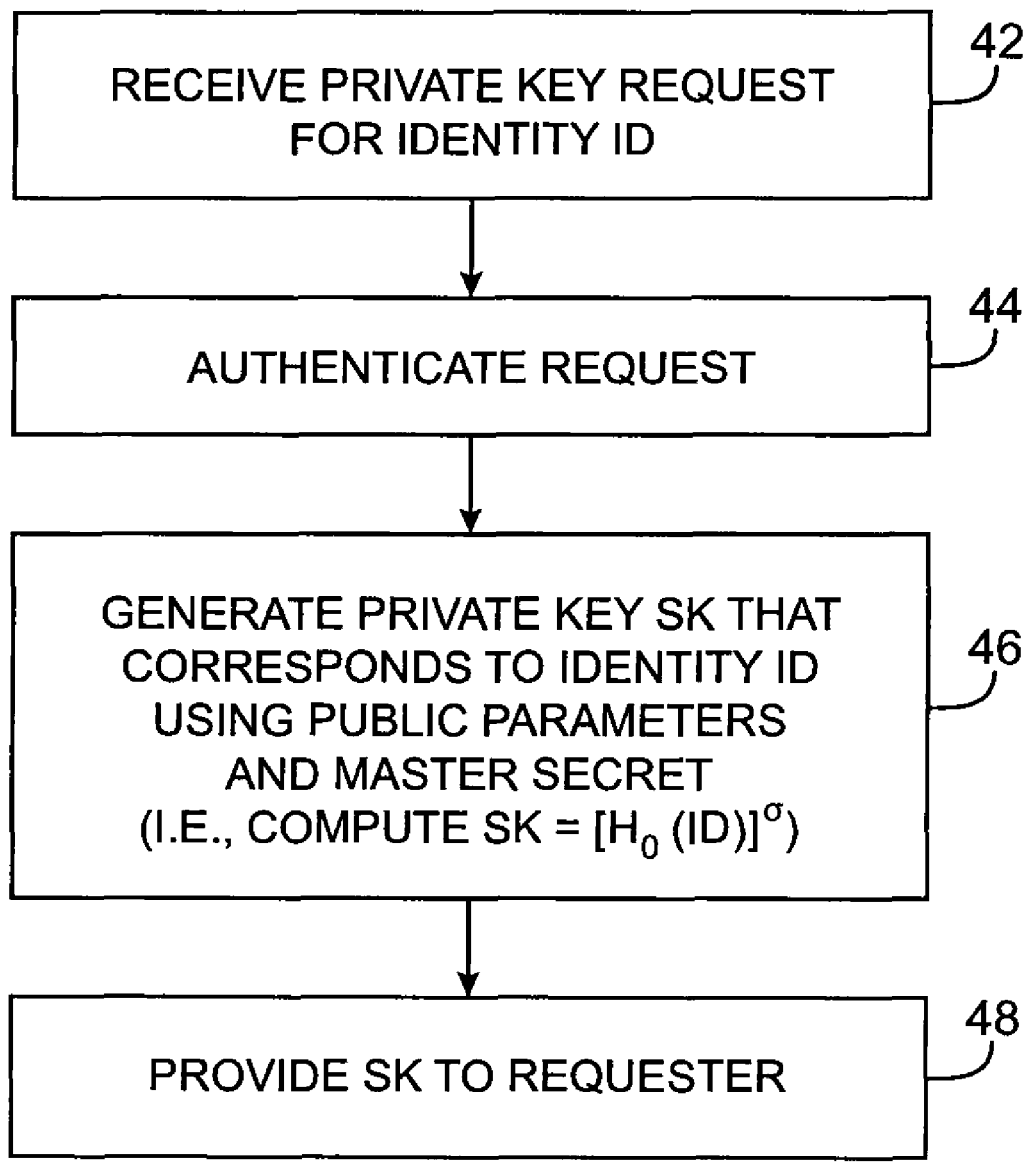
FIG. 4 of a flow chart of illustrative operations that may be performed by a private key generator in response to an IBE key request in accordance with the present invention.

Illustrative steps involved in responding to IBE private key requests are shown in FIG. 4.

At step 42, the IBE private key generator 16 may receive a request for a private key. The private key request may be received electronically over communications network 14 from a user. Information such as the IBE public key ID that corresponds to the desired IBE private key may be provided with the key request to identify which IBE private key is needed.

At step 44, the private key generator 44 may authenticate the private key requester using a suitable authentication technique (e.g., using a username and password, biometric techniques, hardware token arrangements, tickets, etc.).

At step 46, if the private key generator 16 has determined that the requester is authorized, the private key generator 16 can generate a private key SK that corresponds to the IBE public key ID (i.e., user/requester identity ID) in the request. The private key generator may use the master secret σ and the hash function $H_0$ to generate SK by computing SK= $[H_0(ID)]^σ$.

At step 48, the private key generator may provide the IBE private key to the requester. For example, the IBE private key generator can send the private key to the requester over network 14. The IBE private key is preferably delivered to the requester securely (e.g., using a trusted communications path or an encrypted message, etc.).

Figure 5:
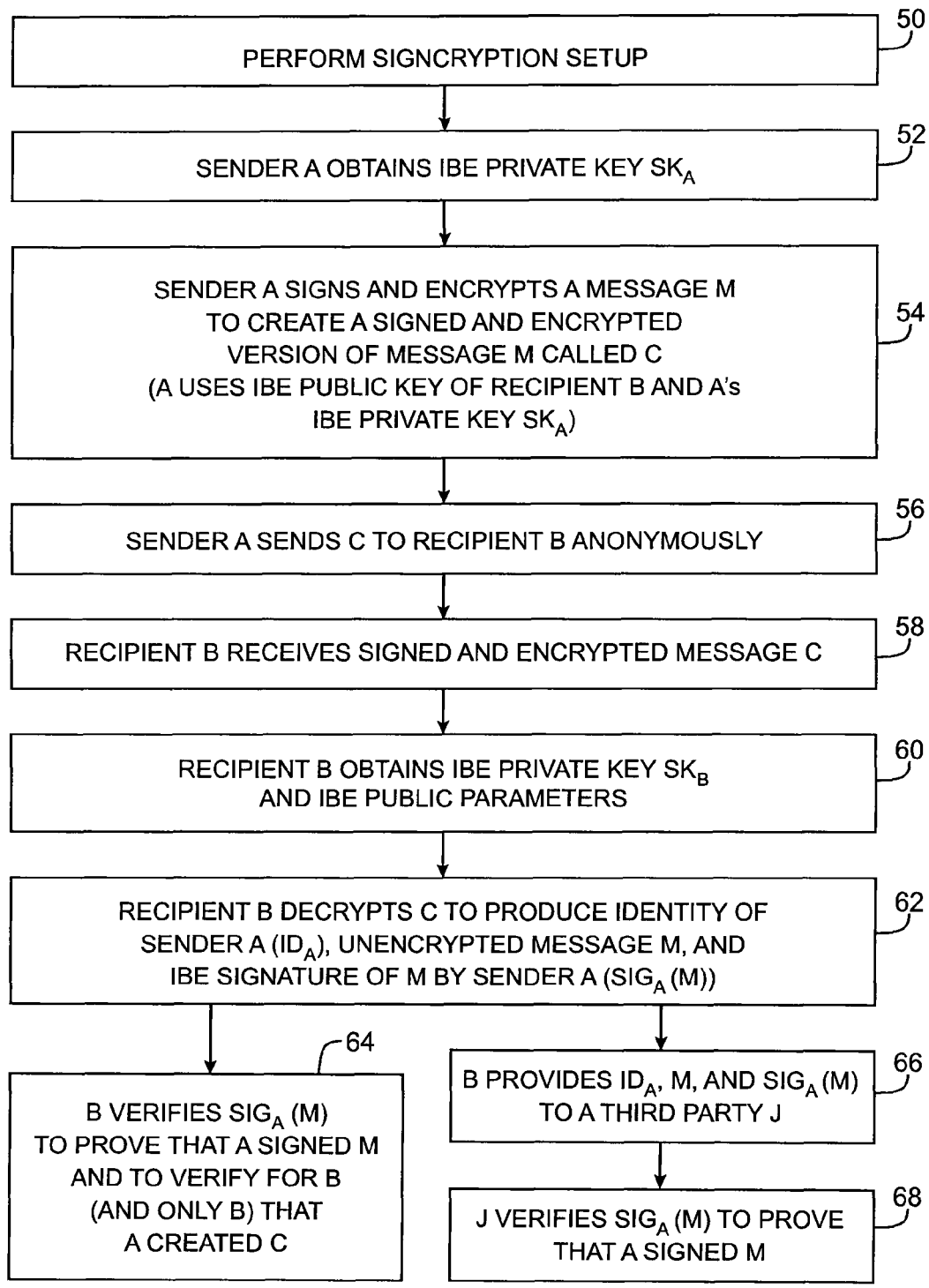
FIG. 5 is a flow chart of illustrative steps involved in using the signcryption scheme to support secure communications between a message sender and a message recipient and to perform verification operations in accordance with the present invention.

FIG. 5 is a flow chart showing illustrative steps involved in using the signcryption scheme of the present invention to sign and encrypt messages and to decrypt and verify messages. When system 10 is initially set up, the curve setup and other signcryption setup steps of FIGS. 2 and 3 are performed using the IBE private key generator (step 50).

At some later time, a sender A who desires to encrypt and digitally sign a message for a recipient B uses a private key request to obtain the sender's private key $SK_A$ from the private key generator (step 52). The private key generator 16 may handle the private key request using the operations of FIG. 4. The sender (and other users in system 10) may cache IBE private keys locally to reduce the frequency of IBE private key requests or may request IBE private keys in real time.

At step 54, sender A signs and encrypts a message M to create a signed and encrypted version of message M. This signed and encrypted version of message M is called ciphertext C. In performing the signcryption operation of step 54 to generate ciphertext C, sender A uses the IBE public key of the recipient B ($ID_B$) (e.g., recipient B's email address) and sender A's IBE private key $SK_A$.

At step 56, sender A sends the ciphertext C to recipient B over communications network 14. Transmission is anonymous. An attacker cannot determine the authorship of the message by examining ciphertext C because sender A's identity is embedded in encrypted form within ciphertext C.

At step 58, recipient B receives the signed and encrypted message (ciphertext C) from sender A.

At step 60, recipient B obtains the IBE private key $SK_B$ of recipient B (e.g., by retrieving $SK_B$ from a local cache or by submitting a key request to IBE private key generator 16 and receiving the key $SK_B$ over network 14). Recipient B may also obtain the IBE public parameters (e.g., g and $g^σ$) during an earlier setup operation or during step 60 if this information has not previously been obtained and stored locally by recipient B.

At step 62, recipient B may decrypt the ciphertext C. The decryption operation reveals the identity of the sender (i.e., the IBE public key of the sender $ID_A$), the message contents M, and the IBE digital signature of M by sender A (i.e., $SIG_A(M)$).

Recipient B can perform verification operations at step 64. During step 64, recipient B can verify the digital signature $SIG_A(M)$ to prove that sender A signed M and to verify for B (and only B) that A created C. Due to the ciphertext unlinkability property of the present IBE signcryption scheme, the authorship of the ciphertext C cannot be verified by users other than recipient B.

An advantage of the two-step approach to message decryption and signature verification of FIG. 5 is that this approach decouples decryption and verification operations. If desired, recipient B can provide $ID_A$, M, and the digital signature information $SIG_A(M)$ to another user (e.g., a third party J) at step 66. If this is done, the third party J may verify the digital signature by sender A of message M at step 68, thereby proving to J that A signed M.

Figure 6:
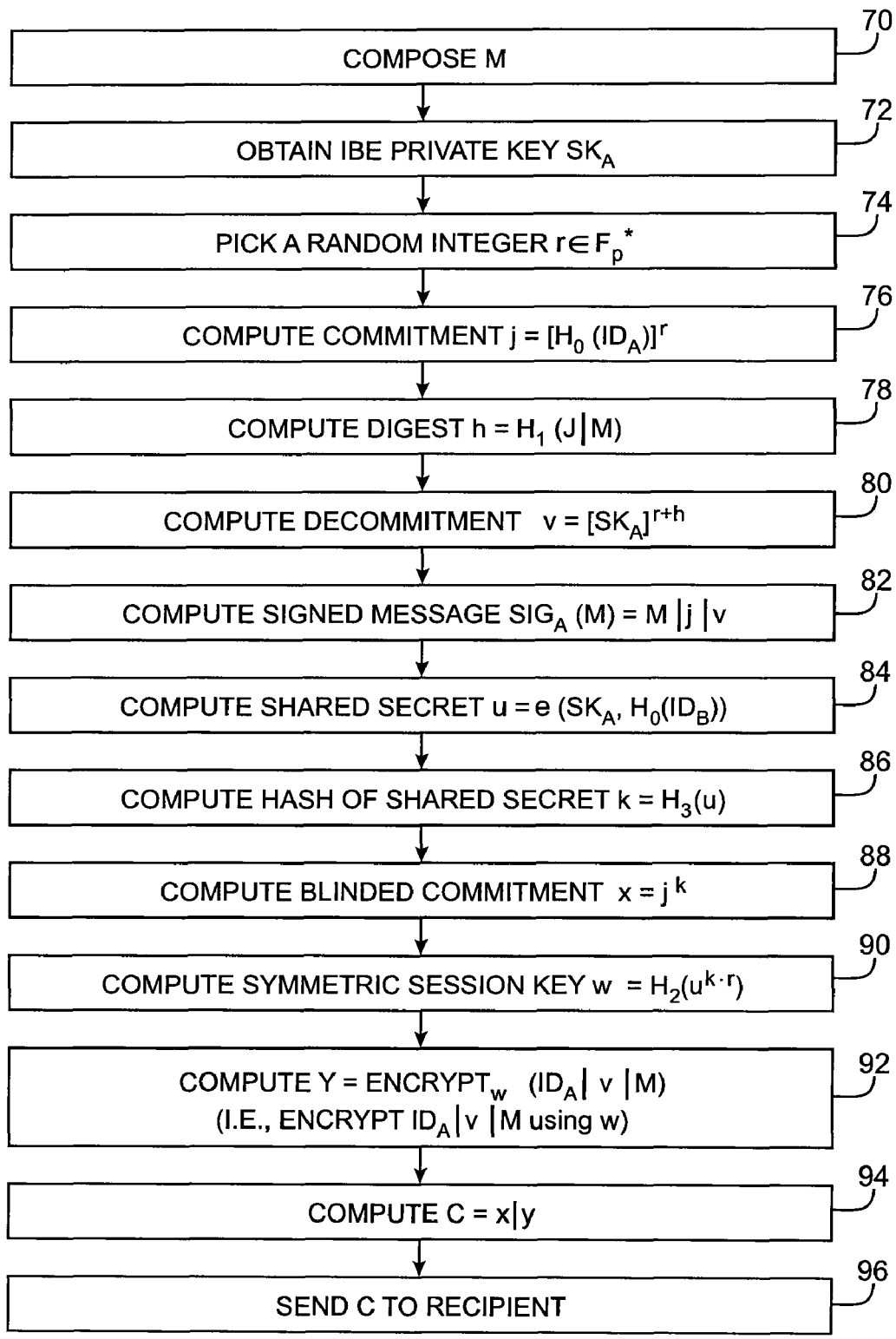
FIG. 6 is a flow chart of illustrative steps involved in encrypting and signing a message in accordance with the present invention.

Illustrative steps involved in the combined signature/encryption (signcryption) process of the present invention are shown in FIG. 6. The steps of FIG. 6 may be performed on the equipment of the sender 12 (e.g., a computer at sender A connected to network 14, as shown in FIG. 1).

At step 70, sender A may compose or otherwise obtain data to be signed and encrypted. For example, the sender may compose an email message or create or obtain any other suitable type of data M.

The sender may sign the message M using the operations of steps 72, 74, 76, 78, 80, and 82. The sender may encrypt the message based on some of the same parameters used in steps 72, 74, 76, 78, 80 using the operations of steps 84, 86, 88, 90, 92, and 94.

At step 72, the sender may obtain the sender's IBE private key $SK_A$. The sender may obtain the private key $SK_A$ from a local cache or may request and obtain the private key from a private key generator such as IBE private key generator 16 of FIG. 1. During setup operations or at another suitable time, the sender can obtain a copy of the IBE public parameter information to be used for encryption and signing.

At step 74, the sender may pick a secret value r (e.g., a random integer r such as an integer r in the field $F_p^*$).

At step 76, the sender may use the selected secret value r (e.g., the integer), the sender's IBE public key (identity) $ID_A$, and the hash function $H_0$ to calculate a commitment j to the secret value r. (Note that the exponential notation used in FIG. 6 and the other FIGS. signifies multiplication of a point on the elliptic curve E by an integer.)

At step 78, the sender may use the hash function $H_1$ to calculate a digest h from the concatenation of j and M.

At step 80, a decommitment v corresponding to the commitment j can be calculated using the IBE private key of A ($SK_A$) and the value of r+h.

At step 82, the sender can, if desired, compute the digital signature of message M (i.e., $SIG_A(M)$) by concatenating the message M with the digital signature information of j concatenated with v. Step 82 is optional, because, as described below, the exact value of $SIG_A(M)$ need not be sent to the recipient to convey the sender's digital signature. Rather, the digital signature of A can by conveyed to recipient B by embedding the digital signature in ciphertext C. For example, during steps 84-94, digital signature information for the digitally signed message M (i.e., digital signature information j and v) may be incorporated into the ciphertext C through various mathematical operations prior to transmission of C to the recipient.

During steps 84-94, the sender may perform IBE encryption operations using the digital signature information without recomputing new values of r and j. By using the same values of r and j that were used during the signing operations of steps 72-82 to perform the encryption processes of steps 84-94, the digital signing and IBE encryption steps of FIG. 6 become intertwined in a single signcryption operation.

At step 84, the sender may compute the shared secret u, using the mapping e (e.g., the Weil or Tate pairing). The inputs to the mapping e are the IBE private key of the sender $SK_A$ and the hash $H_0$ of recipient B's IBE public key (identity $ID_B$).

At step 86, the sender may compute the hash k of the shared secret u using hash function $H_3$.

At step 90, the shared secret u may be used in calculating a symmetric key w. In particular, the sender may compute a symmetric session key w using the hash function $H_2$ and the calculated value of $u^{k \cdot r}$. Because u is used in calculating the symmetric key w, the process of computing the symmetric key w (which is based on the IBE private key $SK_A$) involves performing a bilinear pairing calculation (using mapping e) on an elliptic or hyperelliptic curve.

At step 92, the sender may perform symmetric-key encryption on the sender's IBE public key (identity $ID_A$) concatenated with v (part of the signature) and the message M. Symmetric session key w is used during this encryption step. This type of two-level encryption operation (in which a symmetric key is used to encrypt the message payload and IBE techniques are used to encrypt the symmetric key) is generally more efficient than single-level (pure) IBE encryption arrangements in which no symmetric key is used. The symmetric key encryption algorithm that is used during step 92 is preferably a deterministic semantically-secure cipher, e.g., a block cipher such as AES (Advanced Encryption Standard) in CBC (Cipher Block Chaining) mode with a deterministically determined IV or without IV (Initialization Vector), or a stream cipher such as RC4 used in Pseudo-OTP (One Time Pad) mode, among many other suitable possibilities.

During the encryption operation of step 92, the IBE private key $SK_A$ is being used (by virtue of its contribution to the shared secret u at step 84). This encryption operation also involves the encryption of digital signature information such as digital signature information v that itself was calculated using $SK_A$ (step 80) during the digital signing process. Thus, the present signcryption scheme involves using $SK_A$ twice—first in digitally signing the message M to produce digital signature information (i.e., the decommitment v) and second in encrypting this digital signature information (i.e., by contributing to the shared secret u at step 84 and therefore the symmetric-key encryption process of step 92). The private key $SK_A$ is therefore used in encrypting a message that has already been signed using the same private key $SK_A$.

At step 94, the sender may produce ciphertext C (the encrypted version of the signed message M) by concatenating x and y.

At step 96, sender A may, if desired, send the ciphertext C to recipient B. Because the message M is encrypted, the message is confidential. An attacker cannot decrypt the message. Moreover, an attacker cannot determine authorship of the message from the ciphertext C, because the sender's identity is encrypted with the ciphertext. An attacker also cannot determine the intended recipient's identity from the information contained in C. This provides anonymity.

Figure 7:
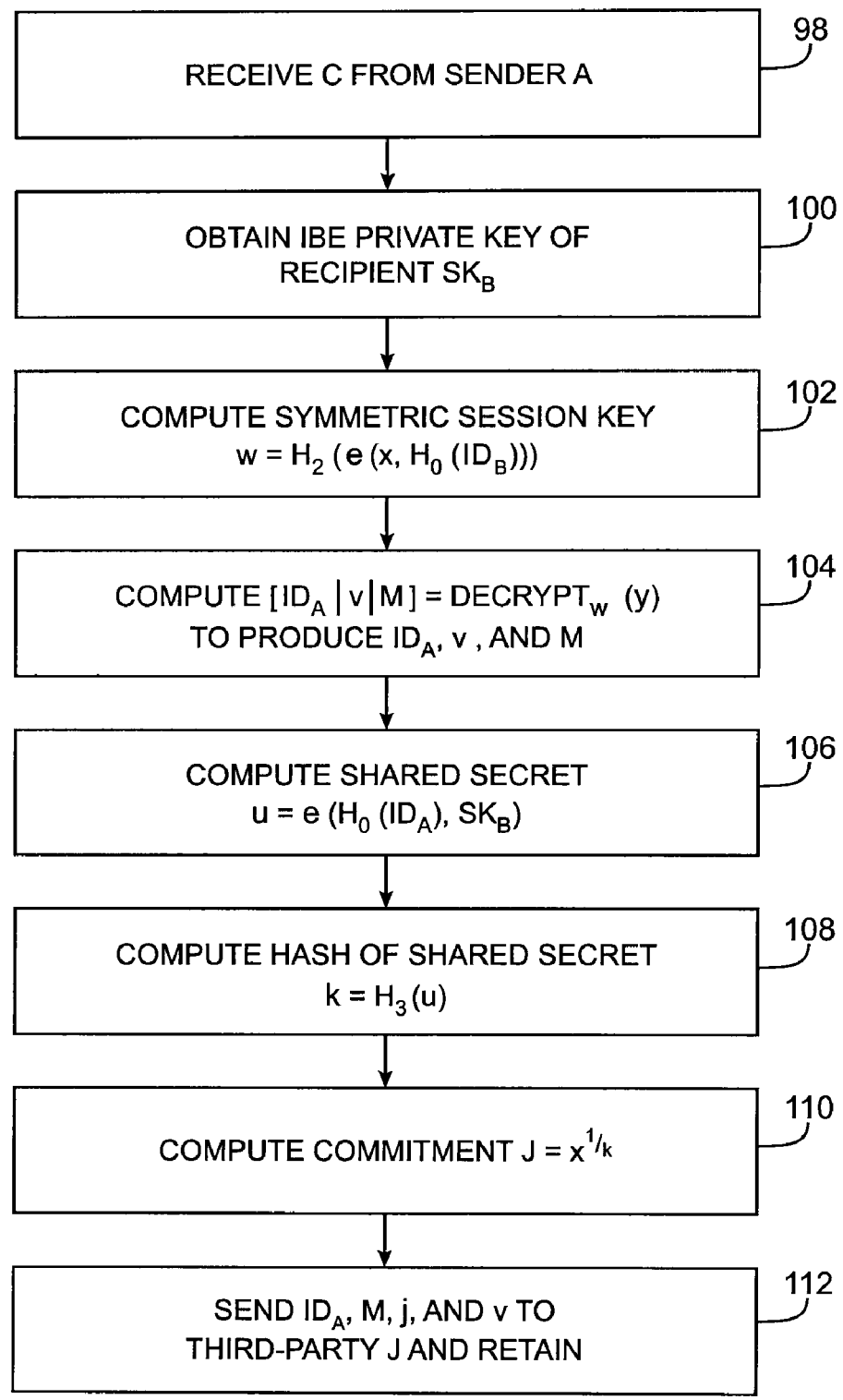
FIG. 7 is a flow chart of illustrative steps in decrypting a signed and encrypted message in accordance with the present invention.

Illustrative steps involved in decrypting the encrypted message are shown in FIG. 7.

At step 98, recipient B may obtain a copy of the signed and encrypted message. For example, if sender A sent the digitally signed and encrypted version of the message to recipient B over network 14, recipient B can receive the ciphertext C for that message at step 98. The ciphertext C includes the blinded commitment x and y, which is the symmetric-key-encrypted version of the message concatenated with the sender identity and the decommitment.

At step 100, recipient B can obtain recipient B's IBE private key $SK_B$. This key is the IBE private key that corresponds to the IBE public key $ID_B$ (i.e., an IBE public key for the recipient that is formed from or based on the recipient's identity). Recipient B can retrieve $SK_B$ from a local cache or can request a copy of $SK_B$ from IBE private key generator 16 (FIG. 1). During setup, or at another suitable time such as during step 100, recipient B can also obtain a copy of the IBE public parameter information.

At step 102, recipient B can generate the symmetric session key w using the IBE public key of recipient B ($ID_B$), the hash function $H_0$, the value of the blinded commitment x obtained from the ciphertext C, the mapping e, and the hash function $H_2$.

At step 104, recipient B may compute the value of $ID_A|v|M$ (i.e., the identity/IBE public key of sender A concatenated with the decommitment v and message M) by performing a symmetric key decryption operation on y (obtained from the ciphertext x|y). The symmetric session key w that was computed at step 102 is used during symmetric key decryption operations (e.g., during AES or RC4 decryption operations). The IBE public key $ID_A$ that is computed at step 104 corresponds to the IBE private key of the sender $SK_A$ that was used by sender A during encryption (i.e., to compute the decommitment at step 80 of FIG. 6) and that was appended to the message before encryption (step 92 of FIG. 6).

At step 106, recipient B may compute the shared secret u using the mapping e (e.g., the Weil or Tate pairing), the hash function $H_0$, the identity/IBE public key of the sender $ID_A$, and recipient B's IBE private key $SK_B$.

At step 108, the recipient can use the shared secret u and hash function $H_3$ to compute a hash of the shared secret k.

At step 110, the recipient can use k and x (obtained from the ciphertext C) to compute the commitment j. At this point, recipient B has decrypted the ciphertext C to produce $ID_A$, M, j, and v. Unlike the signcryption process of FIG. 6, in which multiple intertwined signing and encryption operations were used to perform a single signcryption operation, the decryption operation of FIG. 7 does not include any signature verification steps. Signature verification is performed during a separate operation.

At step 112 of FIG. 7, recipient B may retain $ID_A$, M, j, and v for use in verifying the sender's digital signature (j and v) and in authenticating the ciphertext C, and/or may send this information to a third party J (FIG. 1), so that J can verify the sender's digital signature.

Figure 8:
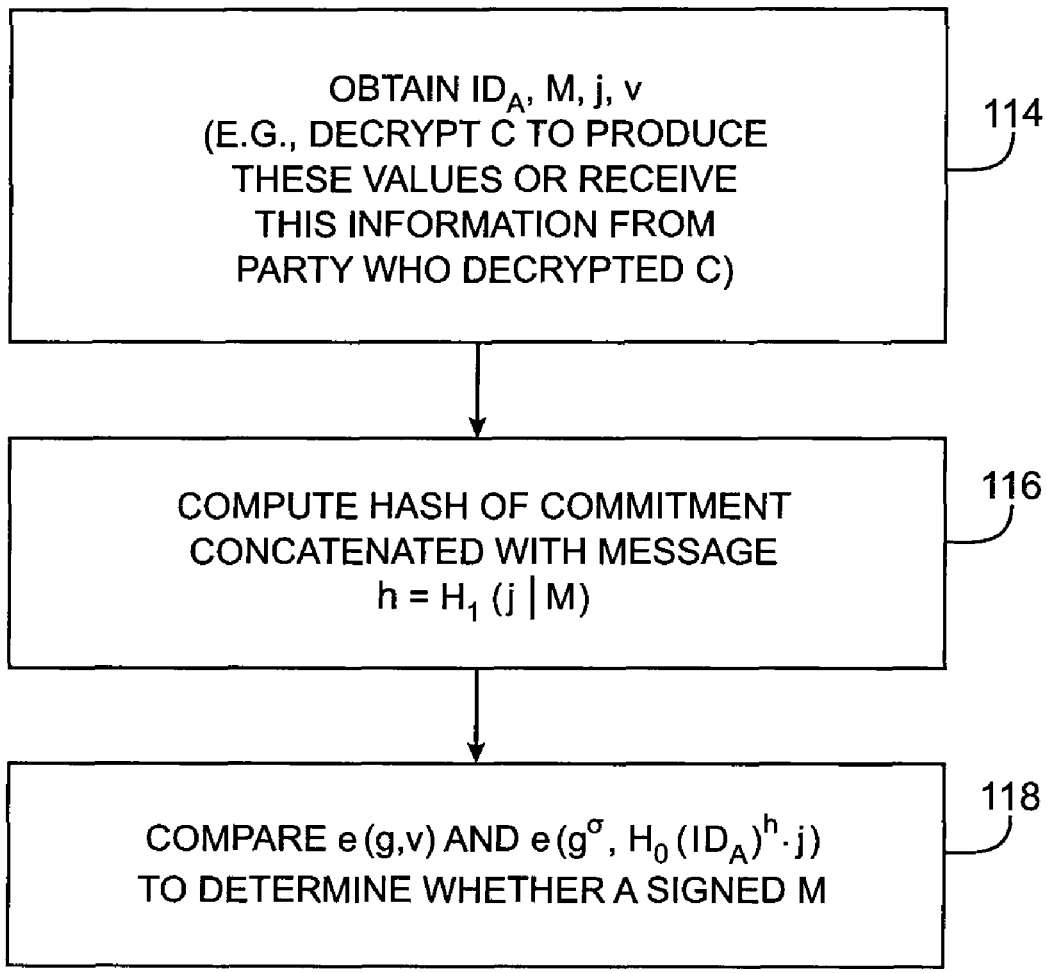
FIG. 8 is a flow chart of illustrative steps involved in performing verification operations in accordance with the present invention.

Illustrative steps involved in verifying sender A's digital signature are shown in FIG. 8. The IBE signature verification steps of FIG. 8 are decoupled from the IBE decryption steps of FIG. 7, so signature verification can be performed during a separate operation by separate parties (i.e., by either a recipient B who has retained $ID_A$, M, j, and v or by a third-party J to whom recipient B has provided $ID_A$, M, j, and v).

At step 114, the party performing signature verification (e.g., the recipient or a third party) obtains $ID_A$, M, j, and v.

At step 116, the party performing signature verification (e.g., the recipient or a third party) may compute a hash h of the commitment j concatenated with the message M using hash function $H_1$.

At step 118, the party performing signature verification (e.g., the recipient or a third party) may compute and compare $e(g, v)$ and $e(g^o, H_0(ID_A)^h \cdot j)$ to determine whether A signed M. For the first value, the mapping e operates on the generator g (an IBE public parameter) and the decommitment v. For the second value, the mapping e operates on the IBE public parameter $g^o$ and a value computed by performing the hash of the sender's IBE public key $ID_A$ using hash function $H_0$. The exponential notation ($H_0(ID_A)$ raised to the h) denotes multiplication of the point $H_0(ID_A)$ on the elliptic curve E by the scalar (i.e., integer) h. The dot between $H_0(ID_A)^h$ and j (and the similar notation used elsewhere herein) indicates the operation of addition on elliptic curve E.

If the values of e(g, v) and $e(g^o, H_0(ID_A)^h \cdot j)$ are not the same, the party performing the verification operation can conclude that the signature is not authentic or that the message has been tampered with.

If the values of e(g, v) and $e(g^o, H_0(ID_A)^h \cdot j)$ are the same, the party performing signature verification (e.g., recipient B or third party J) can conclude that the signature is authentic.

In particular, the recipient B or third party J will know that sender A signed message M. In addition, the recipient B will be convinced that sender A created the ciphertext C specifically for recipient B. This is the ciphertext "authentication" property of the present identity-based signcryption scheme. Note, however, that only recipient B knows that the sender A created ciphertext C. This property (known as the ciphertext "unlinkability" property of the present identity-based signcryption scheme) ensures that sender A's signature will not unintentionally be ascribed to metadata associated with ciphertext C. Such metadata might, for example, include message transmission date information, the IP address of the recipient, etc.

Moreover, sender A will not be able to repudiate the signature. This "non-repudiation" property of the IBE signcryption scheme means that sender A cannot deny having signed message M.

The identity-based signcryption scheme of the present invention therefore provides a single signcryption operation (FIG. 6) and two separate decryption and signature verification operations (FIGS. 7 and 8, respectively). Messages can be encrypted so that ciphertext C can be sent anonymously and confidentially. Message senders cannot repudiate their signatures. Due to the ciphertext unlinkability property of this scheme, a sender's signature is not unintentionally applied to metadata other than the ciphertext of a known message.

The foregoing is merely illustrative of the principles of this invention and various modifications can be made by those skilled in the art without departing from the scope and spirit of the invention.

What is claimed is:

1. An identity-based-encryption (IBE) signcryption method in which a sender signs and encrypts a message M for a recipient, comprising:
   at the sender, digitally signing and encrypting, with computing equipment, a message M in a signcryption operation using an IBE private key of the sender $SK_A$ and an IBE public key of the recipient $ID_B$ that is based on the recipient's identity to generate a ciphertext C that is a signed and encrypted version of the message M;
   sending, with computing equipment, the ciphertext C to the recipient anonymously, wherein an attacker cannot deduce the authorship of the message from the ciphertext C;
   at the recipient, decrypting, with computing equipment, the ciphertext C using an IBE private key $SK_B$ of the recipient that corresponds to the IBE public key $ID_B$, wherein decrypting the ciphertext produces an unencrypted version of the message M and an IBE public key of the sender $ID_A$ that corresponds to the IBE private key $SK_A$; and
   at the recipient or at a third party, after the ciphertext has been decrypted by the recipient, performing, with computing equipment, signature verification in an operation that is separate from the decryption of the ciphertext, wherein performing the signature verification comprises using the decrypted message M and the IBE public key of the sender $ID_A$ to prove that the sender signed the message M.

2. The signcryption method defined in claim 1 wherein digitally signing and encrypting the message M comprises using the IBE private key $SK_A$ in digitally signing the message M to produce digital signature information and using the IBE private key $SK_A$ in encrypting at least a portion of the digital signature information.

3. The signcryption method defined in claim 2 wherein using the IBE private key $SK_A$ in digitally signing the message M comprises computing a commitment to a secret value and computing a corresponding decommitment.

4. The signcryption method defined in claim 2 wherein using the IBE private key $SK_A$ in encrypting the digital signature information comprises using the IBE private key to compute a symmetric key.

5. The signcryption method defined in claim 4 further comprising using the symmetric key to encrypt the message.

6. The signcryption method defined in claim 4 further comprising using the symmetric key to encrypt the IBE public key of the recipient, at least a portion of the digital signature information, and the message.

7. The signcryption method defined in claim 1 wherein digitally signing and encrypting the message M in the signcryption operation comprises:
   computing a commitment to a secret value r and computing a corresponding decommitment;
   using the IBE private key $SK_A$ in digitally signing the message M to produce digital signature information; and
   using the secret value r in encrypting the message M.

8. The signcryption method defined in claim 7 wherein using the secret value r in encrypting the message M comprises using the secret value r to compute a symmetric key.

9. The signcryption method defined in claim 8 further comprising using the symmetric key to encrypt the message.

10. The signcryption method defined in claim 8 further comprising using the symmetric key to encrypt the IBE public key of the recipient, at least a portion of the digital signature information, and the message.

11. The signcryption method defined in claim 1 wherein digitally signing and encrypting the message M comprises using the IBE private key $SK_A$ in encrypting the message M.

12. The signcryption method defined in claim 1 wherein digitally signing and encrypting the message comprises performing multiplication on an elliptic or hyperelliptic curve.

13. A method comprising:
   obtaining, with computing equipment, an identity-based-encryption (IBE) private key of a user;
   using the IBE private key to compute, with computing equipment, a commitment to a secret value and a corresponding decommitment; and
   using a symmetric key that is based on the IBE private key to encrypt, with computing equipment, at least one of the commitment and the decommitment, wherein using the symmetric key to encrypt comprises:
   concatenating the decommitment and a message; and
   using the symmetric key to encrypt the concatenated decommitment and message.

14. A method comprising:
obtaining, with computing equipment, an identity-based-encryption (IBE) private key of a user;
using the IBE private key to compute, with computing equipment, a commitment to a secret value and a corresponding decommitment; and
using a symmetric key that is based on the IBE private key to encrypt, with computing equipment, at least one of the commitment and the decommitment, wherein using the symmetric key to encrypt comprises:
concatenating an IBE public key with a message and the decommitment; and
using the symmetric key to encrypt the concatenated IBE public key, decommitment, and message.

15. A method comprising:
obtaining, with computing equipment, an identity-based-encryption (IBE) private key of a user;
using the IBE private key to compute, with computing equipment, a commitment to a secret value and a corresponding decommitment; and
using a symmetric key that is based on the IBE private key to encrypt, with computing equipment, at least one of the commitment and the decommitment, wherein computing the decommitment comprises performing multiplication on an elliptic or hyperelliptic curve.

16. A method comprising:
obtaining, with computing equipment, an identity-based-encryption (IBE) private key of a user;
using the IBE private key to compute, with computing equipment, a commitment to a secret value and a corresponding decommitment;
using a symmetric key that is based on the IBE private key to encrypt, with computing equipment, at least one of the commitment and the decommitment; and
computing the symmetric key that is based on the IBE private key by performing a bilinear pairing calculation on an elliptic or hyperelliptic curve.

17. An identity-based-encryption (IBE) signcryption method in which a sender signs and encrypts a message M for an intended recipient, comprising:
at the sender, digitally signing and encrypting, with computing equipment, a message M in a signcryption operation using an IBE private key of the sender $SK_A$ and an IBE public key of the intended recipient $ID_B$ that is based on the intended recipient's identity to generate a ciphertext C that is a signed and encrypted version of the message M;
sending, with computing equipment, the ciphertext C to the intended recipient anonymously, wherein an attacker cannot deduce the intended recipient of the message from the ciphertext C;
at the intended recipient, decrypting, with computing equipment, the ciphertext C using an IBE private key $SK_B$ of the intended recipient that corresponds to the IBE public key $ID_B$, wherein decrypting the ciphertext produces an unencrypted version of the message M and an IBE public key of the sender $ID_A$ that corresponds to the IBE private key $SK_A$; and
at the intended recipient or at a third party, after the ciphertext has been decrypted by the intended recipient, performing, with computing equipment, signature verification in an operation that is separate from the decryption of the ciphertext, wherein performing the signature verification comprises using the decrypted message M and the IBE public key of the sender $ID_A$ to prove that the sender signed the message M.

18. The method defined in claim 17 wherein sending the ciphertext C to the intended recipient anonymously comprises sending the ciphertext C to the intended recipient anonymously such that the attacker cannot deduce the authorship of the message from the ciphertext C.

* * * * *